United States Patent [19]

Osborne et al.

[11] 3,999,066
[45] Dec. 21, 1976

[54] TRITIUM-IN-AIR MONITOR

[75] Inventors: Richard V. Osborne; Norman W. Tepley, both of Deep River, Canada

[73] Assignee: Atomic Energy of Canada Limited, Ottawa, Canada

[22] Filed: Dec. 11, 1975

[21] Appl. No.: 639,641

[52] U.S. Cl. .............................. 250/304; 250/364
[51] Int. Cl.² .................... G01T 1/20; G01N 31/00
[58] Field of Search .......... 250/304, 364, 432, 434

[56] References Cited

UNITED STATES PATENTS

| | | | |
|---|---|---|---|
| 2,907,881 | 10/1959 | Roucayrol et al. | 250/364 |
| 2,998,519 | 8/1961 | Tunnicliffe et al. | 250/304 |
| 3,021,427 | 2/1962 | Bayly et al. | 250/304 |
| 3,679,366 | 7/1972 | Benson et al. | 250/304 |

Primary Examiner—Harold A. Dixon
Attorney, Agent, or Firm—Ronald G. Bitner

[57] ABSTRACT

A system for continuously monitoring air for the presence of tritiated water vapor comprising: contacting a predetermined mass flow of an air sample with a predetermined flow of a liquid miscible with tritiated water to transfer any tritiated water vapor in the air sample to the liquid; stripping radioactive noble gases from the liquid with a stream of gas; and analyzing the liquid for beta radiation to determine the presence of tritium. In the preferred embodiment of the apparatus an air-liquid contactor, a gas-liquid separator and a stripper are combined into a single unit with a common outlet for the contacted air and stripping gas.

6 Claims, 2 Drawing Figures

TRITIUM-IN-AIR MONITOR

BACKGROUND OF THE INVENTION

This invention relates to a method and apparatus for monitoring air for the presence of tritiated water vapor.

The presence of tritiated water vapor within a nuclear power station can present a health hazard. The detection of tritiated water in air is complicated by the possibility of an accompanying presence of radioactive noble gases such as argon-41 and noble gas fission products (e.g. radiokryptons and radioxenons). A satisfactory monitor must be insensitive to such interference.

One presently used method comprises collecting tritiated water vapor in a water bubbler, desiccant or freeze-out trap for subsequent measurement of the tritium by scintillation or proportional counting. However, this is not an unattended monitoring method but one that involves manipulation of the sampling system by operators. Continuous methods that have been proposed or are used deficient in other respects such as sensitivity and time response.

SUMMARY OF THE INVENTION

An object of the present invention is to provide continuous monitoring of air for the presence of tritiated water vapor.

Another object is to provide for the detection of tritiated water vapor in air with relatively low sensitivity to radioactive nobel gases and variation in humidity.

Another object is to provide a method and apparatus for monitoring air for tritiated water vapor content which provides a response time and sensitivity suitable for radiologic protection or control purposes.

Another object is to provide an apparatus for monitoring air for tritiated water vapor which is simple in construction and simple to operate.

In accordance with the present invention, a predetermined mass flow of sample air is continuously contacted with a predetermined flow of a liquid miscible with tritiated water to transfer the tritiated water vapor in the air sample to the liquid. A stream of gas, free of radioactive nuclides, is passed through the liquid to strip any radioactive noble gases from the liquid. The liquid is then analyzed for beta radiation to determine the presence of tritium.

DESCRIPTION OF THE PREFERRED EMBODIMENT

Figure 1:
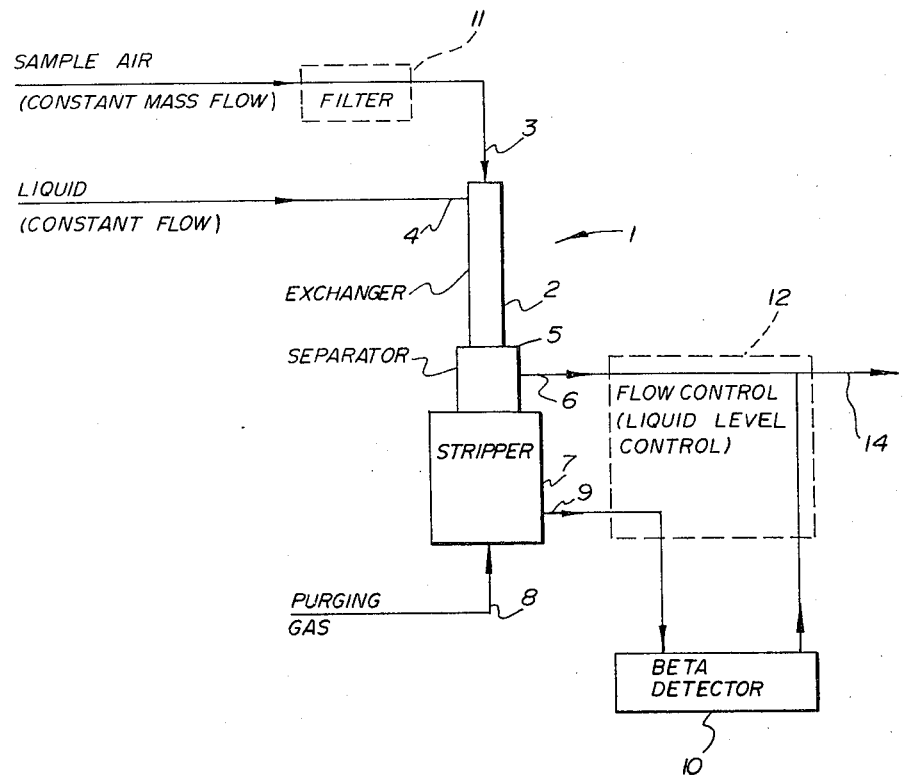
FIG. 1 is a schematic diagram illustrating the monitoring system of the present invention.

Referring to FIG. 1, the monitoring system comprises a tritium exchanger 1, in the form of a gas-liquid contacting device 2, with a sample air inlet 3 and liquid inlet 4; a gas-liquid separator 5 with gas outlet 6; a stripping device 7 with a purging gas inlet 8, purged liquid outlet 9, and gas outlet 6; and a beta radiation detector 10.

In operation, sample air, containing any tritium and radioactive nobel gases, that may be present, is introduced at a predetermined constant mass flow rate to inlet 3 of exchanger 1. A liquid, miscible with tritiated water, is introduced at a predetermined constant rate into the exchanger 1 at inlet 4. In the exchanger 1, the air sample is contacted with the liquid which results in any tritiated water vapor in the sample being transferred to the liquid. At the same time, some gases in the air sample will also be dissolved in the liquid, including radioactive noble gases which interfere with tritium detection. The air-liquid mixture passes into the gas-liquid separating means 5 and air exits at outlet 6. The liquid containing dissolved gases and any tritiated water that may be present passes into the stripper 7. A gas, free of any radioactive nuclides that could interfere with the measurement of tritium, is introduced at inlet 8, stripping any radioactive noble gases dissolved in the liquid. The stripping gas and radioactive noble gases exit at outlet 6 along with air. The liquid stripped of radioactive noble gases is passed through a detector 10 to detect or measure the beta radiation to determine the presence of tritium.

Figure 2:
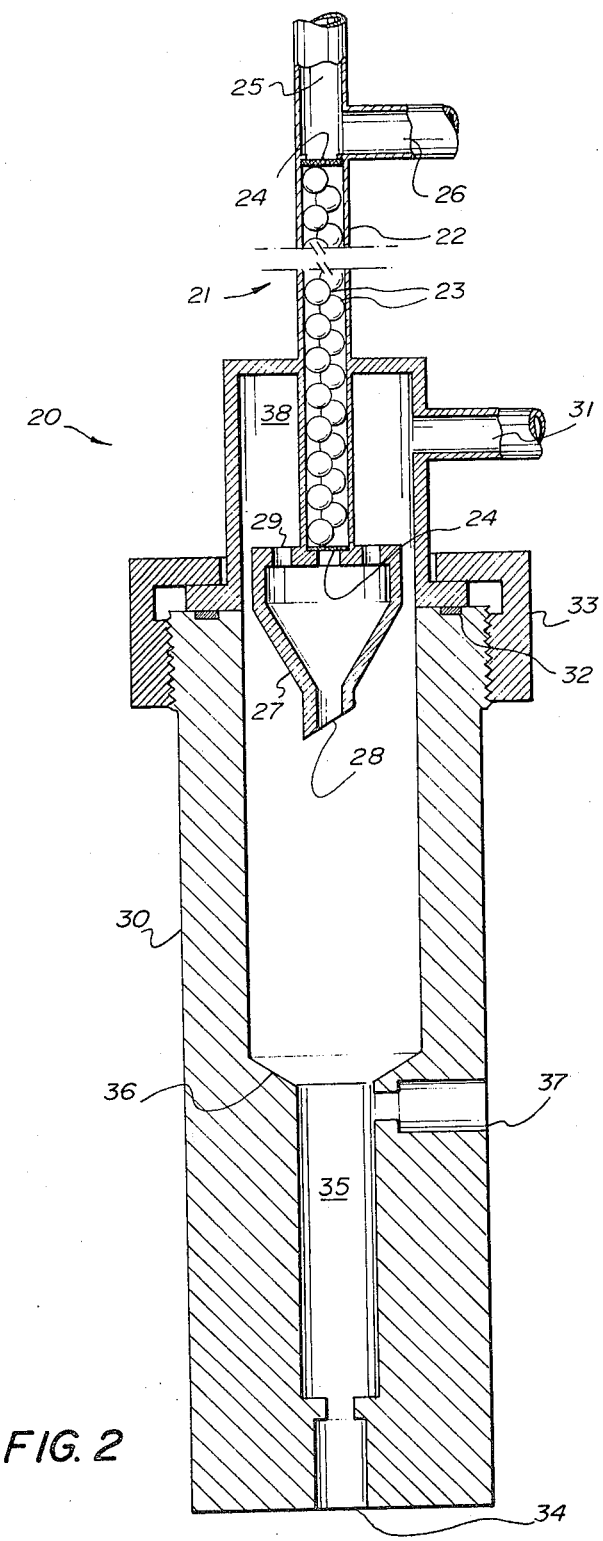
FIG. 2 is a sectional elevation showing details of one embodiment of the apparatus for collecting tritium water vapor from an air sample and preparing it for tritium detection.

FIG. 2 shows details of an embodiment of an apparatus 20 for collecting tritiated water vapor from an air sample and preparing it for detection. The apparatus includes a gas-liquid contacting device 21 which comprises a tubular member 22 packed with an inert material such as glass beads 23 to increase the interface area between the air and liquid. The glass beads are confined by upper and lower meshes 24. Attached to the upper end of the tubular member is an inlet 25 for the air sample and an inlet 26 for a liquid, which is miscible with tritiated water, such as water. Attached to the lower end of the tubular member 22 is a gas-liquid separator 27 which separates the tritium carrying liquid mixture from the sample air. The liquid mixture passes into the stripper 30 through outlet 28 while sample air passes through openings 29 to the outlet 31. The separator 27 is designed to avoid splashing of a large surface and resulting hold-up of tritium activity. The stripper 30 is sealed to the gas-liquid contactor by means of an O-ring 32 and clamp ring 33. Air, or other gas free of radioactive contaminants which would interfere with the measurement, is introduced at inlet 34 and bubbled through the water in the purge space 35 removing any noble gases dissolved in the liquid. Bubbles are broken at the expansion section 36. The liquid, now depleted in radioactive noble gases exits through the outlet 37 while the purging gas passes up past the gas-liquid separator 27 to the gas chamber 38 and exits at outlet 31 which is also the outlet for sample air. A small fraction of the purging gas accompanies the liquid out through outlet 37.

With reference to FIG. 1, the system preferably includes control means 12 for controlling flow of the gas and/or liquid issuing from outlets 6 and 9 respectively. In particular the control means 12 may be used to insure that the level of liquid in the stripper 7 remains at a suitable level so that all liquid exits at outlet 9. Simple control means 12 may consist of a throttle valve in the gas outlet 6. The gas and liquid outlets are preferably interconnected to a common outlet 14 to provide a common pressure reference.

If required, a filter 11 may be used to remove from the air sample radioactive, and other, particles which may include particulate fission products. Shielding can be used to reduce interference from gamma radiation.

A suitable detector for tritium in the water leaving outlet 9 is a scintillation counter. The detector may be used to indicate the presence of tritium above a predetermined level, or may provide a quantitative measure of the tritium present.

A scintillation counter will indicate the amount of tritium present in the liquid. If the flows of air sample and liquid into the device are known, the amount of tritium in air can be determined. Furthermore, if the air sample is supplied at a predetermined constant mass flow, using a suitable known device, the amount of tritium per unit volume of air, at defined temperature and pressure, can be determined irrespective of the actual temperature and pressure of the air sample.

EXAMPLE

Using the apparatus illustrated in FIG. 2, sample air was supplied to inlet 25 at 4000 cubic centimeters per minute at standard temperature and pressure. Water was supplied to inlet 26 at 4 centimeters per minute. Air was used as the purging gas and was supplied to inlet 34 at 500 cubic centimeters per minute. The concentration (activity per unit volume) of tritium in the water at outlet 37 was 1000 times the concentration (activity per unit volume) of tritiated water vapor in the sample air at the inlet and varied less than 3% for any variation in relative humidity of the sample air. The rise time constant of the concentration of tritium in the water leaving outlet 37, following a step increase in concentration of tritiated water vapor in sample air at the inlet, was less than 30 seconds. The separation of tritiated water vapor from radioactive noble gases was such that the signal from a scintillation counter was at least 100 times more sensitive to an activity of tritiated water vapor than to the same concentration of radioactive noble gases in the sample air.

What is claimed is:

1. A method for monitoring air for the presence of tritiated water vapor comprising:
   a. continuously contacting a predetermined mass flow of an air sample with a predetermined flow of a liquid miscible with tritiated water to transfer the tritiated water vapor from the air sample to the liquid;
   b. stripping radioactive noble gases from the liquid with a stream of gas; and
   c. analyzing the liquid for beta radiation to determine the presence of tritium.

2. The method of claim 1 further including the steps of measuring the amount of tritium in the liquid and multiplying by the ratio of liquid to sample air flow to determine the amount of tritium per unit of sample air.

3. An apparatus for monitoring air for the presence of tritiated water vapor comprising:
   a. a gas-liquid contactor for continuously contacting a predetermined mass flow of an air sample with a predetermined flow of liquid miscible with tritiated water to transfer the tritium from the air sample to the liquid;
   b. stripping means for continuously passing a stream of gas through the tritium containing liquid to strip radioactive noble gases therefrom; and
   c. means for detecting beta radiation in the liquid to determine the presence of tritium.

4. The apparatus of claim 3 wherein the gas-liquid contactor is integrally connected with and above the stripping means.

5. The apparatus of claim 4 further comprising a gas-liquid separator disposed between the gas-liquid contactor and stripping means.

6. The apparatus of claim 4 wherein the gas-liquid contactor comprises a tubular member with inert packing.

* * * * *